(12) United States Patent
Pettersson et al.

(10) Patent No.: US 9,204,052 B2
(45) Date of Patent: Dec. 1, 2015

(54) METHOD AND APPARATUS FOR TRANSITIONING CAPTURE MODE

(71) Applicant: Nokia Corporation, Espoo (FI)

(72) Inventors: Gustaf Pettersson, Lund (SE); Johan Windmark, Lund (SE); Alexander Lindskog, Malmo (SE); Adam Fejne, Lund (SE)

(73) Assignee: Nokia Technologies Oy, Espoo (FI)

(*) Notice: Subject to any disclaimer, the term of this patent is extended or adjusted under 35 U.S.C. 154(b) by 172 days.

(21) Appl. No.: 13/765,666

(22) Filed: Feb. 12, 2013

(65) Prior Publication Data

US 2014/0226042 A1      Aug. 14, 2014

(51) Int. Cl.
*H04N 5/232*     (2006.01)

(52) U.S. Cl.
CPC ....... *H04N 5/23296* (2013.01); *H04N 5/23216* (2013.01); *H04N 5/23238* (2013.01); *H04N 5/23245* (2013.01)

(58) Field of Classification Search
CPC . H04N 5/23296; H04N 5/2628; H04N 5/232; H04N 3/1562; H04N 5/23293
USPC ...................................................... 348/240.2
See application file for complete search history.

(56) References Cited

U.S. PATENT DOCUMENTS

| | | | | |
|---|---|---|---|---|
| 8,692,867 B2* | 4/2014 | Bigioi et al. | | 348/36 |
| 2011/0304747 A1* | 12/2011 | Nakata et al. | | 348/231.99 |
| 2014/0118577 A1* | 5/2014 | Masuda | | 348/240.2 |

FOREIGN PATENT DOCUMENTS

| | | |
|---|---|---|
| EP | 2017783 A2 | 1/2009 |
| JP | H11187301 A | 7/1999 |
| WO | 0213515 A2 | 2/2002 |

OTHER PUBLICATIONS

European Search Report from corresponding European Patent Application No. EP14154223.3, dated Jun. 10, 2014, 7 pages.

* cited by examiner

*Primary Examiner* — Twyler Haskins
*Assistant Examiner* — Fayez Bhuiyan
(74) *Attorney, Agent, or Firm* — Nokia Technologies Oy

(57) ABSTRACT

A method comprising operating in a single-frame capture mode, receiving indication of a first input associated with invocation of a first zoom out operation, and transitioning from the single-frame capture mode to a first multiple-frame capture mode based, at least in part, on the first zoom out operation is disclosed.

25 Claims, 12 Drawing Sheets

METHOD AND APPARATUS FOR TRANSITIONING CAPTURE MODE

TECHNICAL FIELD

The present application relates generally to image capture mode.

BACKGROUND

As electronic apparatuses have expanded their capabilities, as well as the number and types of operations they perform, interaction has become increasingly complex and time consuming. For example, apparatus interaction may be prone to errors, confusion, and delay. In some circumstances, a user may miss an opportunity to do something, such as capture an image of an event, due to delays associated with interaction. In other circumstances, a user may avoid utilizing an apparatus capability due to a desire to avoid errors, confusion, or delay. These problems may be more pronounced with regard to a user controlling various types of visual capture modes. Under such circumstances, it may be desirable for a user to be able to transition between visual capture modes in a simple, quick, and intuitive manner.

SUMMARY

Various aspects of examples of the invention are set out in the claims.

One or more embodiments may provide an apparatus, a computer readable medium, a non-transitory computer readable medium, and a method for operating in a single-frame capture mode, receiving an indication of a first input associated with invocation of a first zoom out operation; and transitioning from the single-frame capture mode to a first multiple-frame capture mode based, at least in part, on the first zoom out operation.

One or more example embodiments further determine that performance of the first zoom out operation is beyond a single-frame zoom threshold, wherein the transition from the single-frame capture mode to the first multiple-frame capture mode is based, at least in part, on the determination.

In at least one example embodiment, determination that performance of the first zoom out operation in the single-frame capture mode is beyond the single-frame zoom threshold is based, at least in part, on at least one of: determination that performance of the first zoom out operation in the single-frame capture mode is beyond a horizontal single-frame zoom threshold, or determination that performance of the first zoom out operation in the single-frame capture mode is beyond a vertical single-frame zoom threshold.

In at least one example embodiment, the input relates to an inward pinch gesture.

One or more example embodiments further receive indication of a second input associated with invocation of a second zoom out operation.

One or more example embodiments further transition from the first multiple-frame capture mode to a second multiple-frame capture mode based, at least in part, on the second zoom out operation.

In at least one example embodiment, the first multiple-frame capture mode is a rectilinear multiple-frame capture mode and the second multiple-frame capture mode is at least one of: a cylindrical multiple-frame capture mode, or a spherical multiple-frame capture mode.

In at least one example embodiment, the first multiple-frame capture mode is a cylindrical multiple-frame capture mode and the second multiple-frame capture mode is a spherical multiple-frame capture mode.

One or more example embodiments further determine that performance of the second zoom out operation in the first multiple-frame capture mode is beyond a first multiple-frame zoom threshold, wherein the transition from the first multiple-frame capture mode to the second multiple-frame capture mode is based, at least in part, on the determination.

One or more example embodiments further receive indication of a third input associated with invocation of a zoom in operation.

One or more example embodiments further transition from the second multiple-frame capture mode to the first multiple-frame capture mode based, at least in part, on the zoom in operation.

In at least one example embodiment, determination that performance of the second zoom out operation in the first multiple-frame capture mode is beyond the first multiple-frame zoom threshold is based, at least in part, on at least one of: determination that performance of the second zoom out operation in the first multiple-frame capture mode is beyond a horizontal first multiple-frame zoom threshold, or determination that performance of the second zoom out operation in the first multiple-frame capture mode is beyond a vertical first multiple-frame zoom threshold.

One or more example embodiments further receive indication of a second input associated with invocation of a zoom in operation.

One or more example embodiments further transition from the first multiple-frame capture mode to the single-frame capture mode based, at least in part, on the zoom in operation.

BRIEF DESCRIPTION OF THE DRAWINGS

For a more complete understanding of embodiments of the invention, reference is now made to the following descriptions taken in connection with the accompanying drawings in which.

DETAILED DESCRIPTION OF THE DRAWINGS

Figure 1:
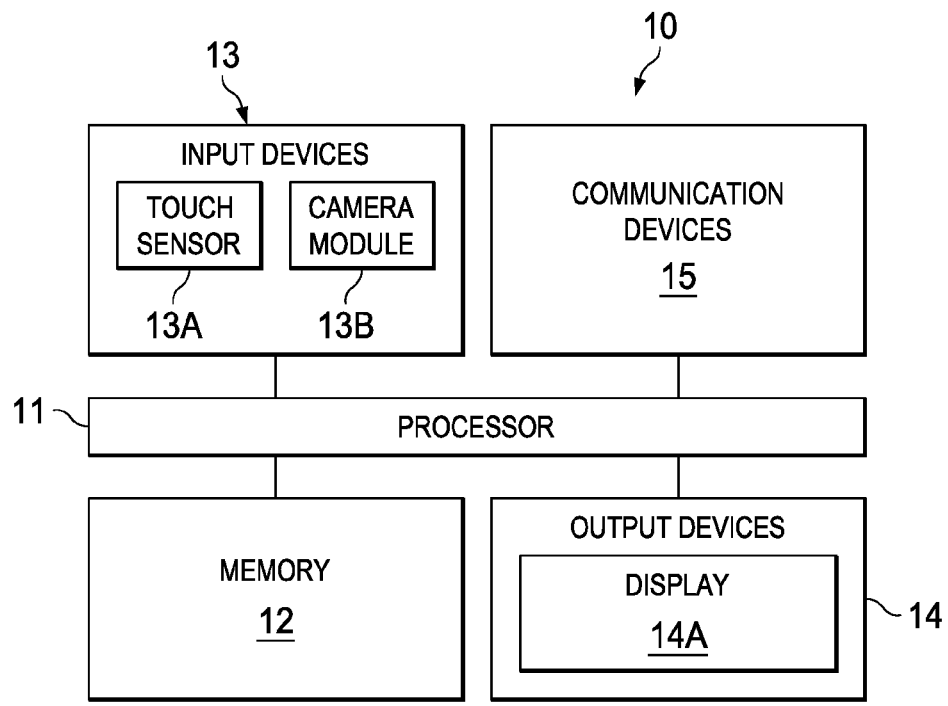
FIG. 1 is a block diagram showing an apparatus, such as an electronic apparatus 10, according to an example embodiment.

An embodiment of the invention and its potential advantages are understood by referring to FIGS. 1 through 11C of the drawings.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to an example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses, may readily employ embodiments of the invention. Electronic apparatus 10 may be a portable digital assistant (PDAs), a pager, a mobile computer, a desktop computer, a television, a gaming apparatus, a laptop computer, a media player, a camera, a video recorder, a mobile phone, a global positioning system (GPS) apparatus, and/or any other types of electronic systems. Moreover, the apparatus of an example embodiment need not be the entire electronic apparatus, but may be a component or group of components of the electronic apparatus in other example embodiments.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described in regarding FIGS. 2A-11C. In at least one example embodiment, memory 12 includes computer program code such that the memory and the computer program code are configured to, working with the processor, cause the apparatus to perform one or more actions described herein.

The electronic apparatus 10 may further comprise communication devices 15. In at least one example embodiment, communication devices 15 comprise at least one of an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described in conjunction with FIGS. 2A-11C. For example, processor 11 may comprise means, such as a digital signal processor device, a microprocessor device, various analog to digital converters, digital to analog converters, processing circuitry and other support circuits, for performing various functions including, for example, one or more of the functions described in conjunction with FIGS. 2A-11C. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described in conjunction with FIGS. 2A-11C. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise output devices 14. In at least one example embodiment, output devices 14 comprise one or more output devices. Output devices 14 may comprise an audio output device, such as a ringer, an earphone, a speaker, and/or the like. Output devices 14 may comprise a tactile output device, such as a vibration transducer, an electronically deformable surface, an electronically deformable structure, and/or the like. Output devices 14 may comprise a visual output device, such as a display, a light, and/or the like. The electronic apparatus may comprise input devices 13. In at least one example embodiment, input devices 13 comprise one or more input devices. Input devices 13 may comprise a light sensor, a proximity sensor, a microphone, a touch sensor, a force sensor, a button, a keypad, a motion sensor, a magnetic field sensor, a camera, and/or the like. A touch sensor, such as touch sensor 13A, and a display, such as display 14A, may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input devices 13 may comprise a media capturing element. The media capturing element may be any means for capturing an image, video and/or audio for storage, display or transmission. For example, in an example embodiment in which the media capturing element is a camera module, such as camera module 13B, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In an example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

Figure 2A:
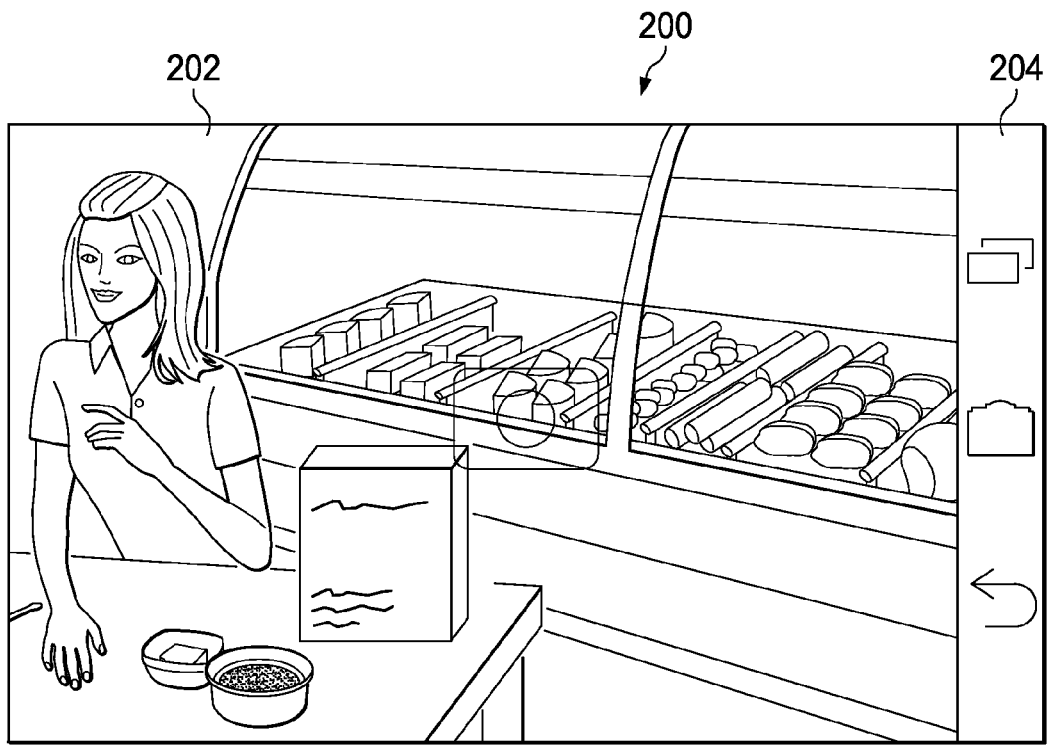
FIGS. 2A-2B are diagrams illustrating single-frame capture modes according to at least one example embodiment.
Figure 2B:
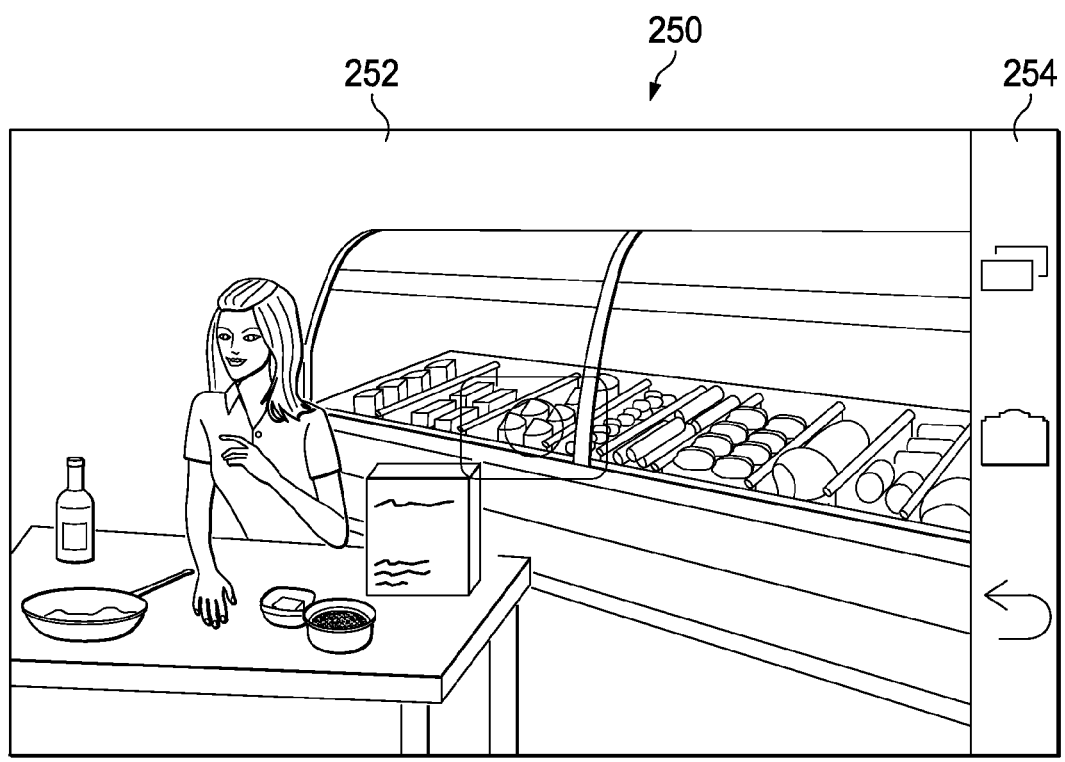

FIGS. 2A-2B are diagrams illustrating single-frame capture modes according to at least one example embodiment. The examples of FIGS. 2A-2B are merely examples of single-frame capture modes, and do not limit the scope of the claims. For example, format of the user interface may vary, content of the user interface may vary, representation of capturing interface elements may vary, and/or the like.

The examples of FIGS. 2A-2B illustrate a capture mode. In at least one example embodiment, a capture mode relates to an interaction mode that allows a user to view and interact with visual information associated with capturing an image and/or video. The interaction mode may allow the user to view and interact with visual information by way of a user interface, a control module, and/or the like.

In at least one example embodiment, the user interface provides visual information associated with capturing the image, such as a representation of visual information received by a camera module, for example camera module 13B. The visual information may be similar to visual information 202 of FIG. 2A, visual information 252 of FIG. 2B, and/or the like. The user interface may further provide visual information associated with visual information received by a camera module, similar as described regarding FIGS. 3A-3C. For example, visual information 202 may be a representation of visual information received from a camera. In at least one example, embodiment, the visual information of the capture mode that includes visual information received by a camera module is referred to as viewfinder information. Such viewfinder information may be a representation of visual information that is being continuously updated by a camera module to allow the user to prepare for an image capture operation.

In at least one example embodiment, a single-frame capture mode relates to a capture mode that fails to further provide visual information associated with visual information received by a camera module. For example, a single-frame capture mode may provide visual information received by a camera module absent visual information associated with visual information received by the camera. For example, a single-frame capture mode may relate to a capture mode that does not incorporate multiple-frame features described in FIGS. 3A-3C.

The capture mode may allow a user to control the camera module, the visual information presented in association with the capture mode, and/or the like. For example, the capture mode may allow a user to invoke an action, such as an image capture operation, for example to take a picture. In another example, the capture mode may provide a control interface that allows a user to control setting associated with visual capturing, such as filter setting, visual effect settings, file management settings, etc. The invocation of an action and/or the control of settings may be by way of received input from a user, such as a key press, a touch, a gesture, and/or the like. In the examples of FIGS. 2A-2B, control elements 204 and 254 relate to information represented on a touch display such that receiving a touch input that correlates with an icon may invoke an action and/or control a setting. In at least one example embodiment, a gesture relates to receiving input that may be unassociated with an icon indicating an action. For example the input may be a touch input in relation to content, such as visual information 202, wherein the invocation of the action or the control is based, at least in part on a characteristic of the touch input, such as position of the touch input, movement of the touch input, speed of the touch input, performance of the touch input in relation to another touch input, and/or the like. For example, the input may be a touch input that moves in a particular pattern. In at least one example embodiment, invocation of an action and or control may be based on receiving an input indicative of more than one touch contact moving towards each other, moving away from each other, and/or the like. In another example embodiment, a gesture relates to input received by way of one or more motion sensors. In such an example, the motion sensor may provide an indication of a gesture associated with movement of the apparatus.

In at least one example embodiment, the capture mode controls the camera module. In addition to the capture previously discussed, the capture mode may control a zoom level associated with the camera module, a light sensitivity setting of the camera module, and/or the like. For example, the camera module may have zoom capability. The zoom capability may be an optical zoom capability, a digital zoom capability, and/or the like. For example, the camera module may perform an optical zoom by way of changing one or more optical characteristics of the camera module. In another example, the camera module may perform a digital zoom by way of performing a transformation of the received visual information such that the transformed visual information provides a representation of a zoomed version of the visual information the received visual information.

In the example of FIGS. 2A and 2B, visual information 202 and visual information 254 relate to two different zoom levels. For example, capture mode 200 may receive indication of an input associated with invocation of a zoom out operation. In such an example, capture mode 200 may cause the camera module to perform a zoom operation. Such a zoom operation may result in capture mode 200 providing visual information resembling visual information 252. In at least one example embodiment, performing such a zoom out operation within a single-frame capture mode may be referred to as performing a zoom out operation in single-frame capture mode.

In another example, capture mode 250 may receive indication of an input associated with invocation of a zoom in operation. In such an example, capture mode 250 may cause the camera module to perform a zoom operation. Such a zoom operation may result in capture mode 250 providing visual information resembling visual information 202. In at least one example embodiment, performing such a zoom in operation within a single-frame capture mode may be referred to as performing a zoom in operation in single-frame capture mode.

In at least one example embodiment, there is one or more input associated with invocation of a zoom operation. An input may be associated with invocation of a zoom operation if there are circumstances where the apparatus performs a zoom operation based, at least in part, on receipt of the input. For example, there may be a slider interface such that user input associated with the slider is associated with a zoom operation. In such an example, movement of the slider in one direction may be associated with a zoom in operation, and movement of the slider in an opposite direction may be associated with a zoom out operation. In another example, a pinch gesture may be associated with a zoom operation. In such an example, a touch input having multiple contact regions moving towards each other may be associated with a zoom out operation, and a touch input having multiple contact regions moving away from each other may be associated with a zoom in operation. In another example, there may be an icon associated with performing a zoom in operation and an icon associated with performing a zoom out operation. In such an example, a selection input of the icon associated with performing the zoom in operation is an input associated with performance of a zoom in operation, and a selection input of the icon associated with performing the zoom out operation is an input associated with performance of a zoom out operation.

Figure 3A:
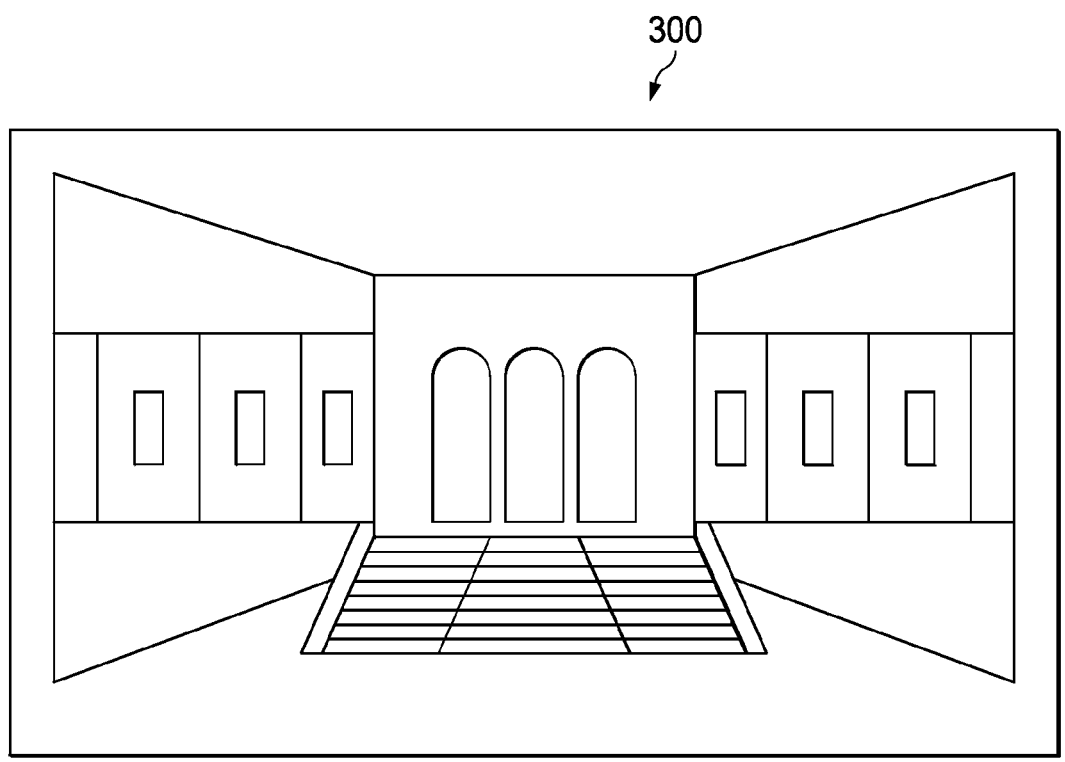
FIGS. 3A-3C are diagrams illustrating multiple-frame modes according to at least one example embodiment.
Figure 3B:
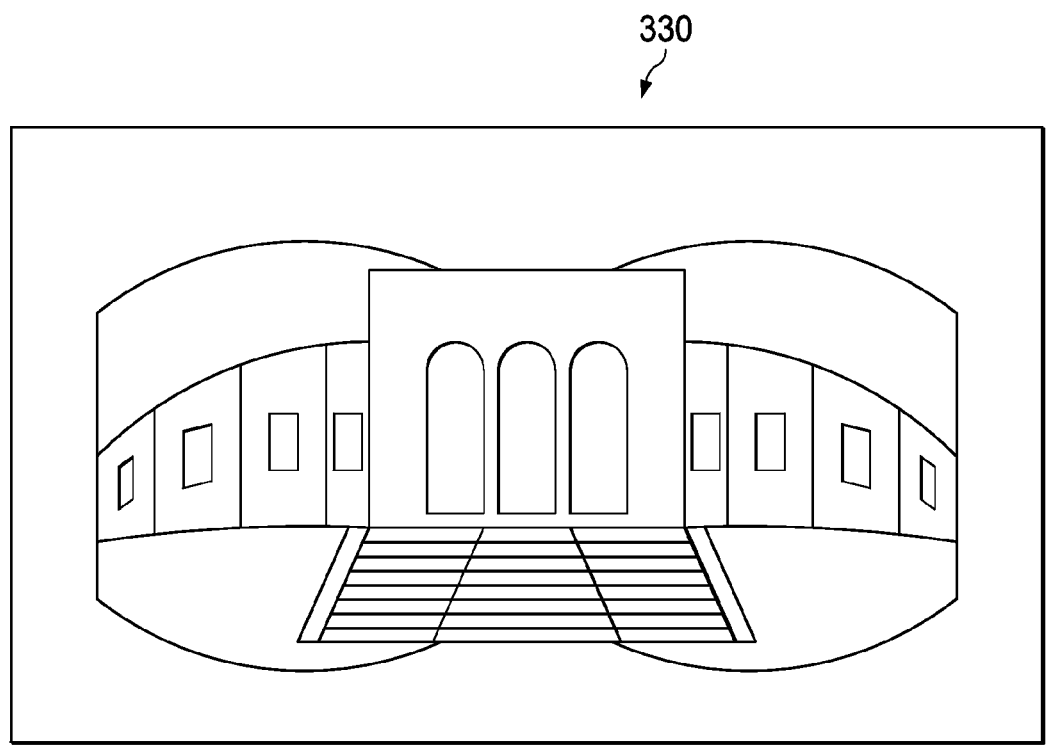
Figure 3C:
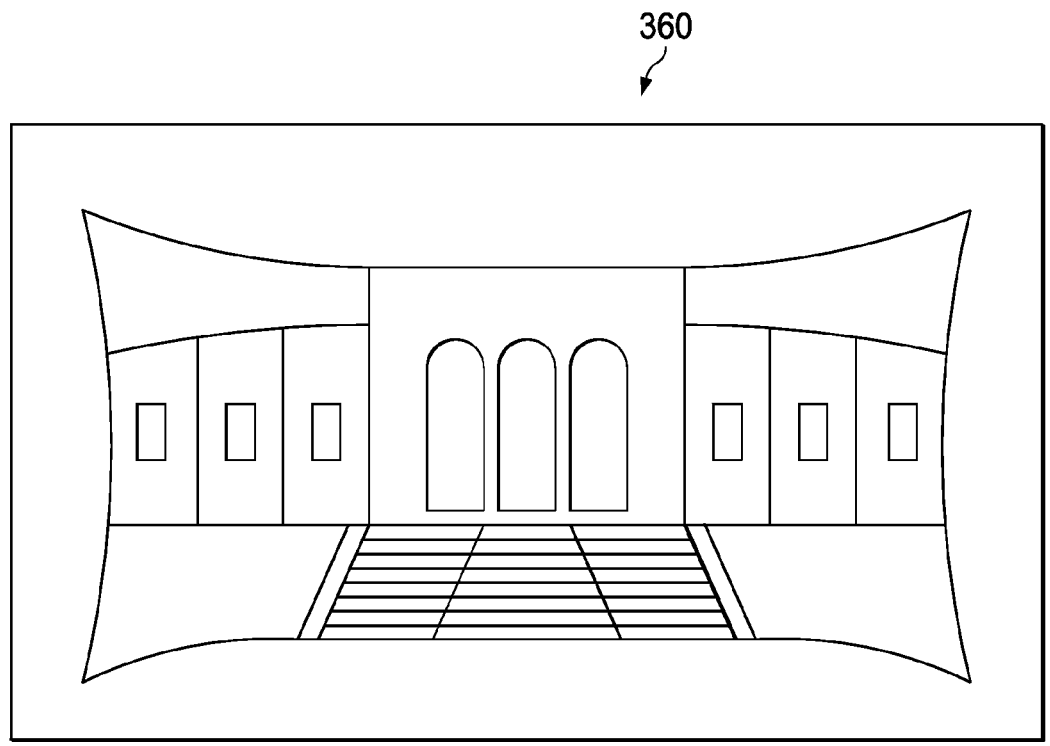

FIGS. 3A-3C are diagrams illustrating multiple-frame modes according to at least one example embodiment. The examples of FIGS. 3A-3C are merely examples of multiple-frame modes, and do not limit the scope of the claims. For example, type of multiple-frame mode may vary, visual effect of multiple-frame mode may vary, and/or the like.

In at least one example embodiment, a capture mode that provides visual information associated with visual information received by a camera module is referred to as a multiple-frame capture mode. A multiple-frame capture mode may provide other visual information associated with position of the visual information received by the camera module. For example, there may be visual information related to a position adjacent to or overlapping with the visual information received by the camera module. In at least one example embodiment, a multiple-frame capture mode utilizes position information associated with visual information received by the camera module to correlate position information associated with other visual information. In such an embodiment, the correlation may be utilized to provide visual information that depicts a panoramic view. The panoramic view may be generated by way of any method for blending position related visual information, such as stitching.

For purposes of simplicity, multiple-frame modes are described in terms of a fixed objective point. For example, the visual information being correlated with visual information received from a camera module is discussed in terms of an angle associated with the visual information. In at least one example embodiment, such an angle relates to an angle difference between the direction of the camera module from which the visual information is being received, and a direction associated with the visual information being correlated. There may be multiple-frames of visual information being correlated at any given time. In at least one example embodiment, each frame of visual information being correlated may have direction associated direction information. It should be understood that methods involving non-fixed objective points may be utilized, and that description in terms of a fixed objective point does not limit the claims in any way.

FIG. 3A is a diagram illustrating a rectilinear multiple-frame mode according to at least one example embodiment. In at least one example embodiment, a rectilinear multiple-frame mode relates to correlation of frames of visual information that utilizes a rectilinear projection of the frames. A rectilinear projection relates to a projection that performs transformations based on angle of a frame such that straight features, such as the walls of buildings, appear with straight lines, as opposed to being curved. In other words, the rectilinear multiple-frame mode relates to a multiple-frame mode that represents multiple-frames as if they are present on a flat surface.

A rectilinear multiple-frame mode may be characterized by having small distortion at the center and exponentially increasing distortion away from the center. An additional characteristic of a rectilinear multiple-frame mode relates to a maximum angle between frames of 180 degrees.

In the example of FIG. 3A, representation 300 relates to a rectilinear multiple-frame mode associated with a left visual information, a center visual information, and a right visual information. It can be seen that the left and right visual information expand as the distance from the center increases.

FIG. 3B is a diagram illustrating a cylindrical multiple-frame mode according to at least one example embodiment. In at least one example embodiment, a cylindrical multiple-frame mode relates to correlation of frames of visual information that utilizes a cylindrical projection of the frames. A cylindrical projection relates to a projection that performs transformations based on angle of a frame such that angle variations are mapped to equally spaced lines. The cylindrical projection may be characterized as if the flat surface of the representation were wrapped in a cylinder around the objective point. In other words, the cylindrical multiple-frame mode relates to a multiple-frame mode that represents multiple-frames as if they are present on a cylindrical surface that has been unrolled in front of the viewer.

A cylindrical multiple-frame mode may be characterized by having small distortion at the center along the axis in which the cylinder encircles with increasing distortion away from that axis. However, changes in angle perpendicular to the axis in which the cylinder encircles are treated in the same manner as rectilinear projection. For example, a cylindrical projection representing horizontal encirclement, the projection can be characterized by little distortion near the vertical center of the projection with exponential distortion as the angel changes upward or downward from that center. An additional characteristic of a cylindrical multiple-frame mode relates to ability to provide a 360 degree representation along the axis of encirclement with exponentially increasing distortion with vertical angle deviation.

In the example of FIG. 3B, representation 330 relates to a cylindrical multiple-frame mode associated with a left visual information, a center visual information, and a right visual information.

FIG. 3C is a diagram illustrating a spherical multiple-frame mode according to at least one example embodiment. In at least one example embodiment, a spherical multiple-frame mode relates to correlation of frames of visual information that utilizes a spherical projection of the frames. A spherical projection relates to a projection that performs transformations based on angle of a frame such that angle variations are mapped to equally spaced circular lines. The cylindrical projection may be characterized as if the flat surface of the representation were wrapped in a sphere around the objective point. In other words, the spherical multiple-frame mode relates to a multiple-frame mode that represents multiple-frames as if they are present on a spherical surface that has been unrolled in front of the viewer.

A spherical multiple-frame mode may be characterized by having small distortion at the center with varying distortion extending radially outward from the center. However, the spherical projection does not have the exponential increase in distortion associated with the rectilinear projection or the cylindrical projection (associated with angle changes perpendicular to the axis of encirclement. For example, a spherical projection can be characterized by little distortion near the center of the projection with varying distortion as the angel changes outward from that center. An additional characteristic of a spherical multiple-frame mode relates to ability to provide a representation vertically and horizontally encircles the objective point.

In the example of FIG. 3B, representation 360 relates to a spherical multiple-frame mode associated with a left visual information, a center visual information, and a right visual information.

Figure 4A:
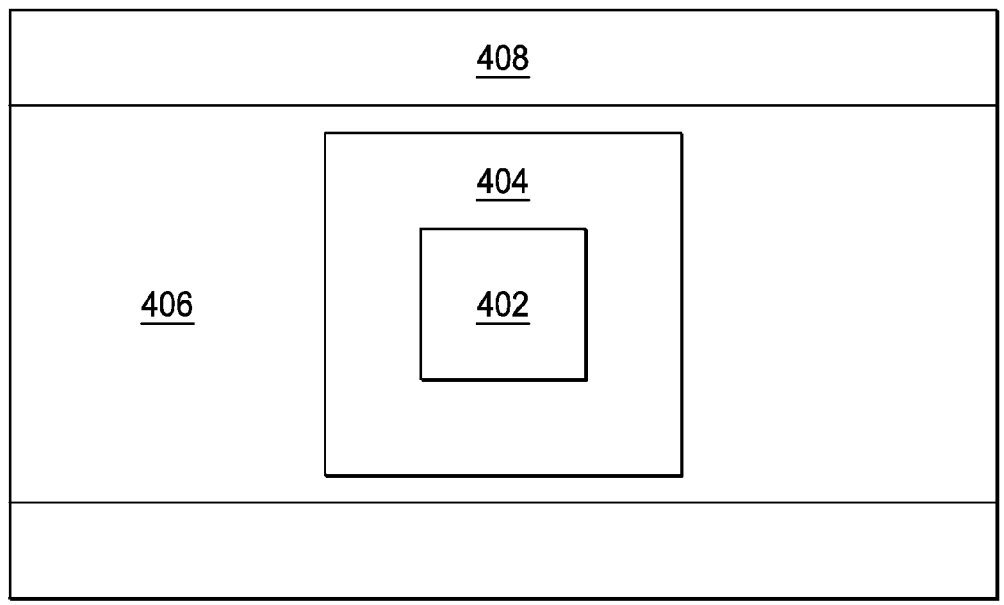
FIG. 4A is a diagram illustrating zoom thresholds according to at least one example embodiment.

FIG. 4A is a diagram illustrating zoom thresholds according to at least one example embodiment. The example of FIG. 4A is merely an example of zoom thresholds, and does not limit the scope of the claims. For example, interrelationship between zoom thresholds may vary, aspect ratio of zoom thresholds may vary, size of zoom thresholds may vary, number of zoom thresholds may vary, and/or the like.

In at least one example embodiment, an apparatus may provide a single-frame capture mode and a multiple-frame capture mode. In such an embodiment, it may be desirable for a user to be able to transition easily between the single-frame capture mode and the multiple-frame capture mode. For example, it may be desirable for the user to be able to invoke the transition by way of input that does not involve navigating through a menu.

In addition, it may be desirable to provide an intuitive way for the user to transition between the single-frame capture mode and the multiple-frame capture mode. For example, it may be desirable for the user to perform an input that extends an interface metaphor with which the user is already familiar.

In at least one example embodiment, the user may transition between a single-frame capture mode and a multiple-frame capture mode by way of a zoom input. Without limiting the claims in any way, at least one technical effect associated with performing the transition between the single-frame capture mode and the multiple-frame capture mode relates to the fact that many capture modes provide a quick and simple interface for invoking a zoom operation. In addition, many users are familiar with the concept of zooming. For example, it is intuitive for users to zoom out to increase capture area. Therefore, without limiting the claims in any way, at least one technical effect associated with utilizing input associated with a zoom operation to invoke transition between the single-frame capture mode and the multiple-frame capture mode is to allow the user to perceive the transition as an extension of zooming, with which the user is already familiar. For example, as a user zooms out to increase capture area, increasing the capture area by transitioning from single-frame capture mode to multiple-frame capture mode would provide a logical extension beyond single-frame zoom out capability. Similarly, as the user zooms in to reduce the capture area, decreasing the capture area by transition from multiple-frame capture mode to single-frame capture mode would provide a logical extension to avoid potential distortion associated with a multiple-frame mode by operating within single-frame zoom capability. Without limiting the claims in any way, at least one technical effect associated with utilizing input associated with a zoom operation for invoking transition between single-frame capture mode and multiple-frame capture mode may be to allow transition to occur based on the needs of the user instead of relying on the user to determine that a need for the transition exists.

It may be desirable to provide a simple and intuitive interface for users to transition from one multiple-frame capture mode to a different multiple-frame capture mode. For example, many users may be unaware of the properties of different multiple-frame modes, or even aware that multiple-frame mode exist. Under such circumstances, it may be desirable for such users to be able to communicate their desire for more or less capture area, by way of providing input associated with a zoom operation, to invoke a transition between one multiple-frame capture mode and a different capture mode. Without limiting the scope of the claims in any way, at least one technical effect associated with such transitioning may be to allow users to perform such transitions as needed without needing to understand the differences between multiple-frame capture modes.

Therefore, in at least one example embodiment, an apparatus may transition between a single-frame capture mode and a multiple-frame capture mode based, at least in part on a zoom operation indicated by a user input. In at least one example embodiment, there may be one or more thresholds associated with a capture mode and the transition between the single-frame capture mode and the multiple-frame capture mode may be based, at least in part, on correlation of a zoom operation with one or more zoom thresholds.

In at least one example embodiment, a capture mode threshold relates to a predetermined zoom transition point associated with a capture mode. For example, a capture mode threshold may be a zoom value, such as 100% zoom, 75% zoom, 50% zoom, and/or the like. In another example, a capture mode threshold may relate to a horizontal value and/or a vertical value. In such an example, a horizontal and/or a vertical threshold may relate to a threshold of 1 frame, 2 frames, 2.5 frames, and/or the like. It should be understood that the units, values, and/or the like of these examples are merely examples and do not limit the claims in any way.

In at least one example embodiment, performing a zoom out operation such that a threshold has been, is, or will be, crossed by performance of the zoom out operation relates to performance of the zoom operation being beyond the zoom threshold. For example, if a zoom out operation will result in crossing of a single-frame zoom threshold, performance of the zoom out operation may be referred to as being beyond the single-frame zoom threshold. In at least one example, embodiment, performing a zoom in operation such that a threshold has been, is, or will be, crossed by performance of the zoom in operation relates to performance of the zoom operation being within the zoom threshold. For example, if a zoom in operation will result in crossing of a single-frame zoom threshold, performance of the zoom in operation may be referred to as being within the single-frame zoom threshold.

A zoom threshold may be determined based, at least in part, on a characteristic of the capture mode to which it applies. The characteristic may relate to a capability limitation, a desirability limitation, and/or the like. For example, a capability limitation may relate to a limitation of a camera module. In such an example, a single-frame zoom threshold may reflect a maximum zoom out value of the camera module. In another example, a desirability limitation may relate to a threshold associated with zooming beyond such threshold causing undesirable distortion. For example, a rectilinear multiple-frame zoom threshold may relate to a delineation of point beyond which visual distortion becomes less desirable than transitioning to a different capture mode, such as cylindrical capture mode or spherical capture mode.

The example of FIG. 4A illustrates examples of zoom thresholds. In the example of FIG. 4 zoom threshold 402 represents a single-frame zoom threshold, zoom threshold 404 represents a rectilinear zoom threshold, and zoom threshold 406 represents a cylindrical zoom threshold. In the example of FIG. 4, region 408 relates to spherical mode, which is beyond zoom threshold 406.

In at least one example embodiment, an apparatus operating in a single-frame capture mode transitions to a rectilinear multiple-frame capture mode based on receiving indication of an input associated with a zoom out operation that is beyond the single-frame zoom threshold 402. In at least one example embodiment, an apparatus operating in a rectilinear multiple-frame capture mode transitions to a cylindrical multiple-frame capture mode based on receiving indication of an input associated with a zoom out operation that is beyond the rectilinear multiple-frame zoom threshold 404. In at least one example embodiment, an apparatus operating in a cylindrical multiple-frame capture mode transitions to a spherical multiple-frame capture mode based on receiving indication of an input associated with a zoom out operation that is beyond the cylindrical multiple-frame zoom threshold 406.

In at least one example embodiment, an apparatus operating in a spherical multiple-frame capture mode and transition to a cylindrical multiple-frame capture mode based on receiving indication of an input associated with a zoom in operation that is within the cylindrical multiple-frame zoom threshold 406. In at least one example embodiment, an apparatus operating in a cylindrical multiple-frame capture mode and transition to a rectilinear multiple-frame capture mode based on receiving indication of an input associated with a zoom in operation that is within the rectilinear multiple-frame zoom threshold 404. In at least one example embodiment, an apparatus operating in a rectilinear multiple-frame capture mode and transition to a single-frame capture mode based on receiving indication of an input associated with a zoom in operation that is within the single-frame zoom threshold 402. In at least one example embodiment a transition from one capture mode to a different capture mode is characterized by an apparatus operating in the capture mode before the transition, and operating in the different capture mode after the transition.

In at least one example embodiment an input may comprise multiple input indicating a zoom input. For example, an input may relate to a user performing a pinch in input. In at least one example embodiment, the pinch in input may relate to a first input associated with a zoom operation that is within a zoom threshold, and a second input that is beyond the zoom threshold. In at least one example embodiment, such a pinch in input may relate to a first input associated with a zoom operation that is within a zoom threshold, a second input that is beyond the zoom threshold, a third input associated with a zoom operation that is beyond the zoom threshold and within a different zoom threshold, and a fourth input that is beyond the different zoom threshold. Input indicating zoom in operations may be combined with input indicating zoom out operations in this manner, such that a continuous gesture associated with a pinch out followed by a pinch in may comprise input associated with a zoom in operation and input associated with a zoom out operation.

In at least one example embodiment, determination that performance of the first zoom out operation is beyond a zoom threshold is based, at least in part, on at least one of: determination that performance of the first zoom out operation in the single-frame capture mode is beyond a horizontal zoom threshold, and/or determination that performance of the first zoom out operation in the single-frame capture mode is beyond a vertical zoom threshold.

Figure 4B:
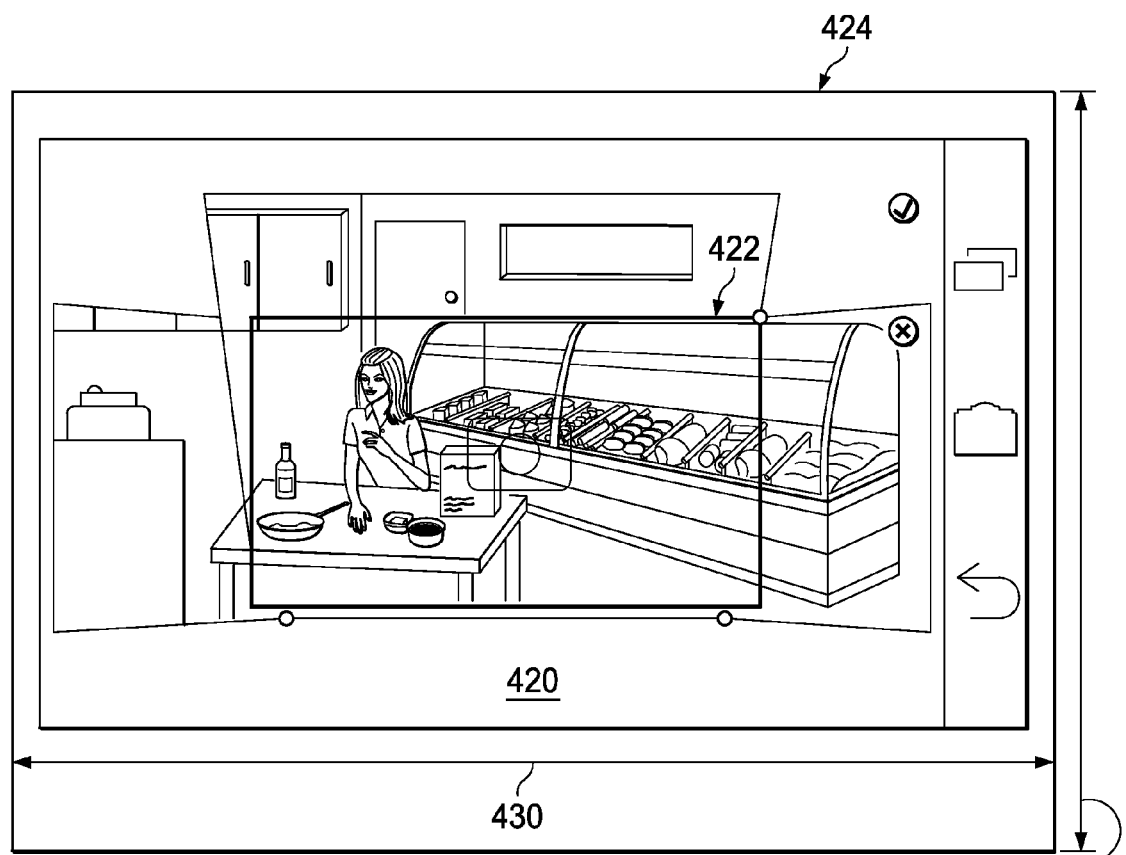
FIGS. 4B-4D are diagrams illustrating multiple-frame capture modes according to at least one example embodiment.
Figure 4C:
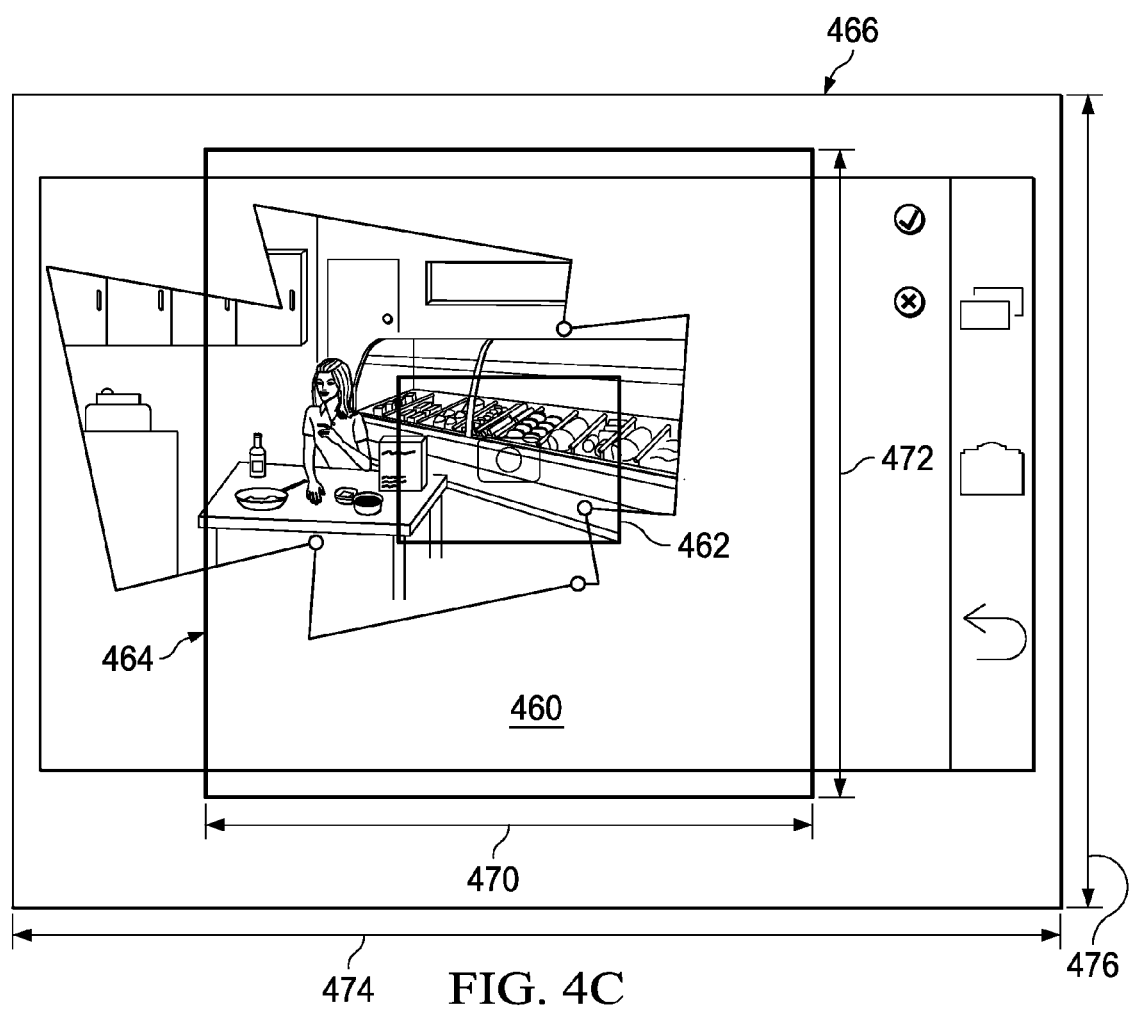
Figure 4D:
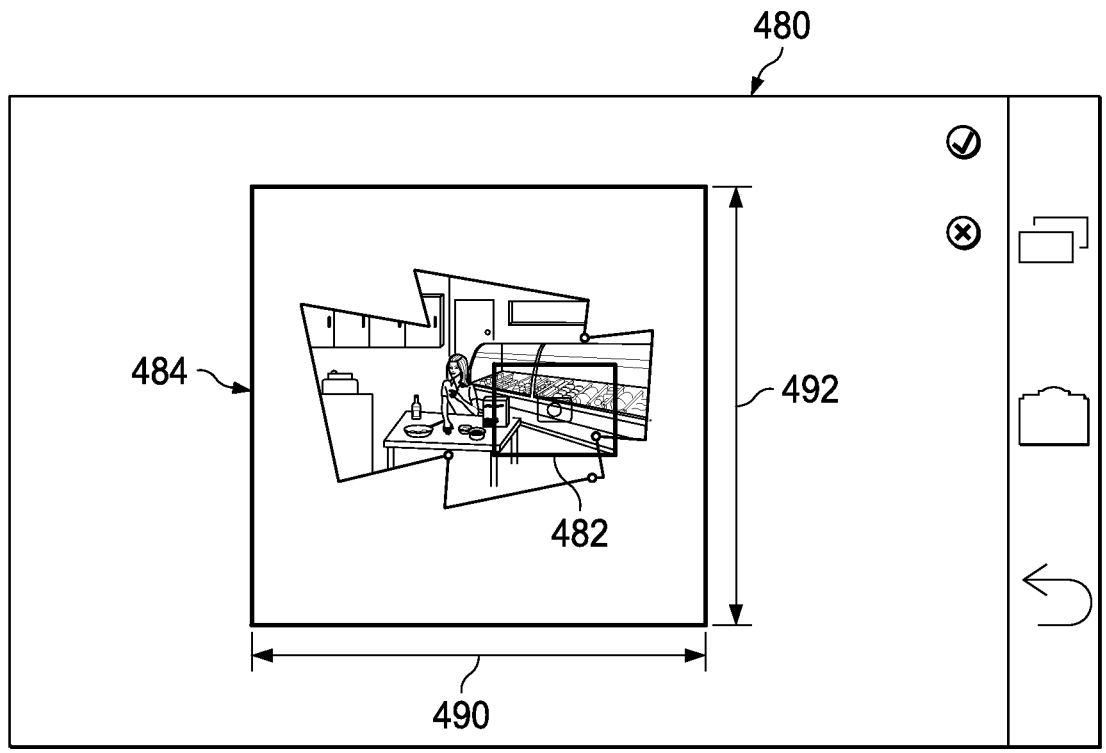

FIGS. 4B-4D are diagrams illustrating multiple-frame capture modes according to at least one example embodiment. The examples of FIGS. 4B-4D are merely examples of multiple-frame capture modes, and do not limit the scope of the claims. For example, format of the user interface may vary, content of the user interface may vary, representation of capturing interface elements may vary, and/or the like.

FIG. 4B is a diagram illustrating rectilinear multiple-frame capture mode 420 according to at least one example embodiment. Rectilinear multiple-frame capture mode 420 includes visual information 422, which corresponds with visual information provided by a camera module. Rectilinear multiple-frame capture mode 420 provides visual information frames in relation to visual information 422 such that the visual information depicts a panoramic view.

The example of FIG. 4B illustrates rectilinear multiple-frame capture mode 420 in relation to a rectilinear multiple-frame zoom threshold 424. In at least one example embodiment, rectilinear multiple-frame zoom threshold 424 comprises vertical rectilinear multiple-frame threshold 432 and horizontal rectilinear multiple-frame threshold 430. It can be seen that the zoom level of rectilinear multiple-frame capture mode 420 is within rectilinear multiple-frame zoom threshold 424.

In at least one example embodiment, the boundary of visual information 422 corresponds with a single-frame zoom threshold. It can be seen that the zoom level of rectilinear multiple-frame capture mode 420 is beyond the single-frame zoom threshold.

FIG. 4C is a diagram illustrating cylindrical multiple-frame capture 460 mode according to at least one example embodiment. Cylindrical multiple-frame capture mode 460 includes visual information 462, which corresponds with visual information provided by a camera module. Cylindrical multiple-frame capture mode 460 provides visual information frames in relation to visual information 462 such that the visual information depicts a panoramic view.

The example of FIG. 4C illustrates cylindrical multiple-frame capture mode 460 in relation to a cylindrical multiple-frame zoom threshold 466 and a rectilinear multiple-frame zoom threshold 464. In at least one example embodiment, cylindrical multiple-frame zoom threshold 466 comprises vertical cylindrical multiple-frame threshold 476 and horizontal cylindrical multiple-frame threshold 474. It can be seen that the zoom level of cylindrical multiple-frame capture mode 460 is within cylindrical multiple-frame zoom threshold 466. In at least one example embodiment, rectilinear multiple-frame zoom threshold 464 comprises vertical rectilinear multiple-frame threshold 472 and horizontal rectilinear multiple-frame threshold 470. It can be seen that the zoom level of cylindrical multiple-frame capture mode 460 may be beyond rectilinear multiple-frame zoom threshold 464. In at least one example embodiment, performance of a zoom operation is determined to be beyond the zoom threshold if performance of the zoom operation is beyond either a vertical zoom threshold or a horizontal zoom threshold. In at least one example embodiment, performance of a zoom operation is determined to be beyond the zoom threshold if performance of the zoom operation is beyond both the vertical zoom threshold and the horizontal zoom threshold.

FIG. 4D is a diagram illustrating spherical multiple-frame capture mode 480 according to at least one example embodiment. Spherical multiple-frame capture mode 480 includes visual information 482, which corresponds with visual information provided by a camera module. Spherical multiple-frame capture mode 480 provides visual information frames in relation to visual information 482 such that the visual information depicts a panoramic view.

The example of FIG. 4D illustrates spherical multiple-frame capture mode 480 in relation to a cylindrical multiple-frame zoom threshold 484. In at least one example embodiment, cylindrical multiple-frame zoom threshold 484 comprises vertical cylindrical multiple-frame threshold 492 and horizontal cylindrical multiple-frame threshold 490. It can be seen that the zoom level of spherical multiple-frame capture mode 480 is beyond cylindrical multiple-frame zoom threshold 484.

Figure 5:
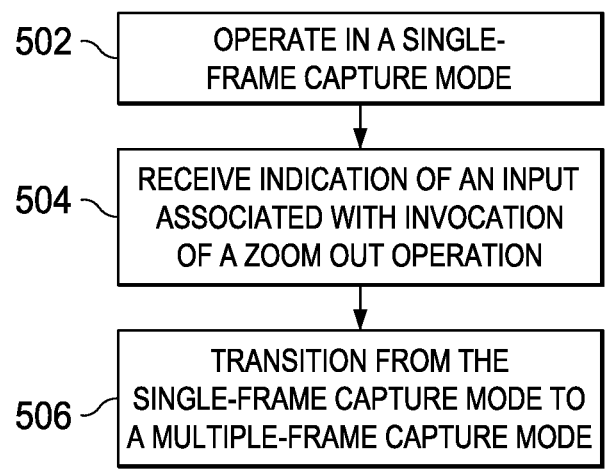
FIG. 5 is a flow diagram illustrating activities associated with transitioning a capture mode according to at least one example embodiment.

FIG. 5 is a flow diagram illustrating activities associated with transitioning a capture mode according to at least one example embodiment. In at least one example embodiment, there is a set of operations that corresponds the activities of FIG. 5. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 5.

At block 502, the apparatus operates in a single-frame capture mode, similar as described regarding FIGS. 2A-2B. At block 504, the apparatus receives an indication of an input associated with invocation of a zoom out operation. The indication may be a message, a signal, a function call, and/or the like that communicates occurrence of the input. The input and the zoom out operation may be similar as described regarding FIGS. 2A-2B. At block 506, the apparatus transitions from the single-frame capture mode to a multiple-frame capture mode based, at least in part, on the zoom out operation, similar as described regarding FIGS. 4A-4D.

Figure 6:
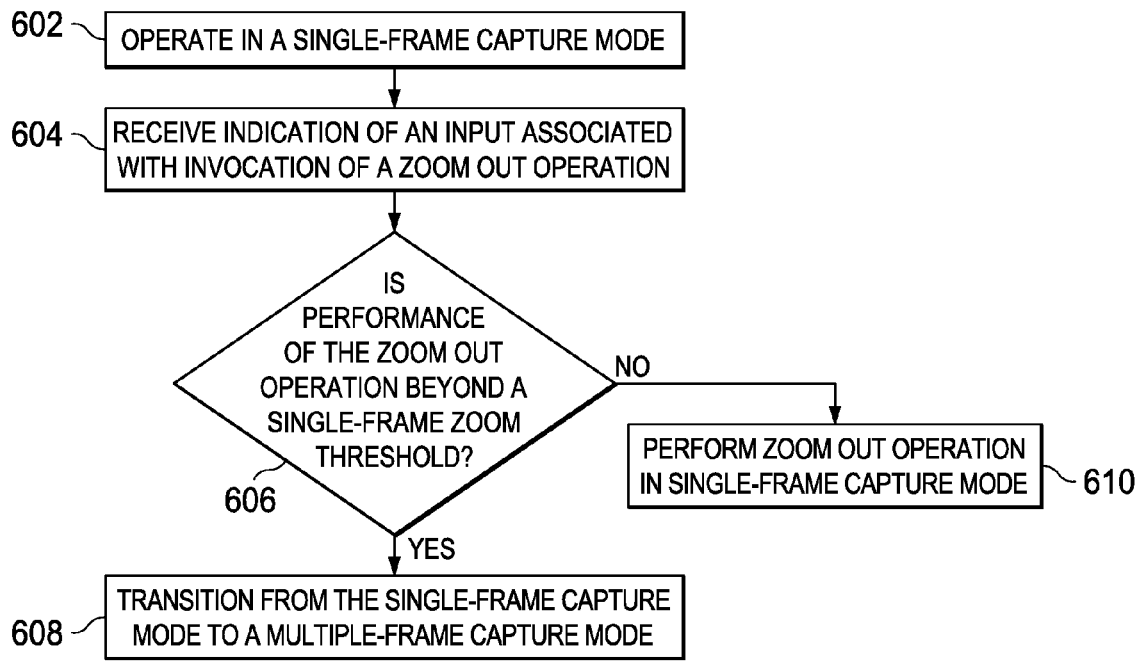
FIG. 6 is a flow diagram illustrating activities associated with transitioning a capture mode according to at least one example embodiment.

FIG. 6 is a flow diagram illustrating activities associated with transitioning a capture mode according to at least one example embodiment. In at least one example embodiment, there is a set of operations that corresponds the activities of FIG. 6. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 6.

At block 602, the apparatus operates in a single-frame capture mode, similar as described regarding block 502 of FIG. 5. At block 604, the apparatus receives an indication of an input associated with invocation of a zoom out operation, similar as described regarding block 504 of FIG. 5. At block 606, the apparatus determines whether performance of the zoom out operation is beyond a single-frame zoom threshold. If the apparatus determines that performance of the zoom out operation is beyond a single-frame zoom threshold, flow proceeds to block 608. If the apparatus determines that performance of the zoom out operation is within a single-frame zoom threshold, flow proceeds to block 610. Determination whether a zoom out operation is beyond or within a zoom threshold may be similar as described regarding FIGS. 4A-4D.

At block 608, the apparatus transitions from the single-frame capture mode to a multiple-frame capture mode based, at least in part, on the zoom out operation, similar as described regarding block 506 of FIG. 5. At block 610, the apparatus performs a zoom out operation in the currently operating capture mode, i.e. without transitioning capture mode, similar as described regarding FIGS. 3A-4D. For example, the apparatus may perform the zoom out operation in single-frame capture mode.

Figure 7:
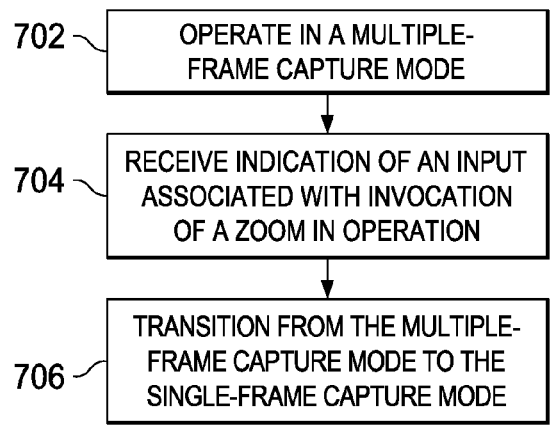
FIG. 7 is a flow diagram illustrating activities associated with transitioning a capture mode according to at least one example embodiment.

FIG. 7 is a flow diagram illustrating activities associated with transitioning a capture mode according to at least one example embodiment. In at least one example embodiment, there is a set of operations that corresponds the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

At block 702, the apparatus operates in a multiple-frame capture mode, similar as described regarding FIGS. 3A-4D. At block 704, the apparatus receives indication of an input associated with invocation of a zoom in operation similar as described regarding FIGS. 2A-2B. At block 706, the apparatus transitions from the multiple-frame capture mode to a single-frame capture mode based, at least in part, on the zoom in operation, similar as described regarding FIGS. 4A-4D.

Figure 8:
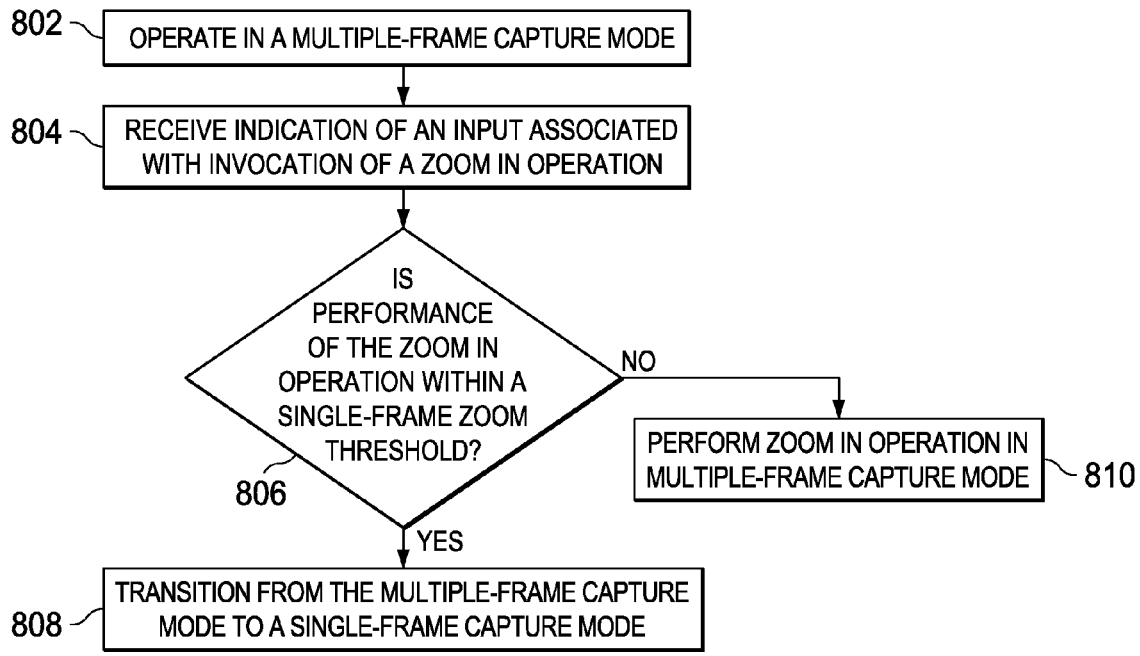
FIG. 8 is a flow diagram illustrating activities associated with transitioning a capture mode according to at least one example embodiment.

FIG. 8 is a flow diagram illustrating activities associated with transitioning a capture mode according to at least one example embodiment. In at least one example embodiment, there is a set of operations that corresponds the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

At block 802, the apparatus operates in a multiple-frame capture mode, similar as described regarding block 702 of FIG. 7. At block 804, the apparatus receives indication of an input associated with invocation of a zoom in operation similar as described regarding block 704 of FIG. 7. At block 806, the apparatus determines whether performance of the zoom in operation is within a single-frame zoom threshold. If the apparatus determines that performance of the zoom operation is within a single-frame zoom threshold, flow proceeds to block 808. If the apparatus determines that performance of the zoom operation is beyond a single-frame zoom threshold, flow proceeds to block 810. Determination whether a zoom in operation is beyond or within a zoom threshold may be similar as described regarding FIGS. 4A-4D.

At block 808, the apparatus transitions from the multiple-frame capture mode to a single-frame capture mode based, at least in part, on the zoom in operation, similar as described regarding block 706 of FIG. 7. At block 810, the apparatus performs a zoom in operation in the currently operating capture mode, i.e. without transitioning capture mode, similar as described regarding FIGS. 3A-4D. For example, the apparatus may perform the zoom in operation in the multiple-frame capture mode.

Figure 9:
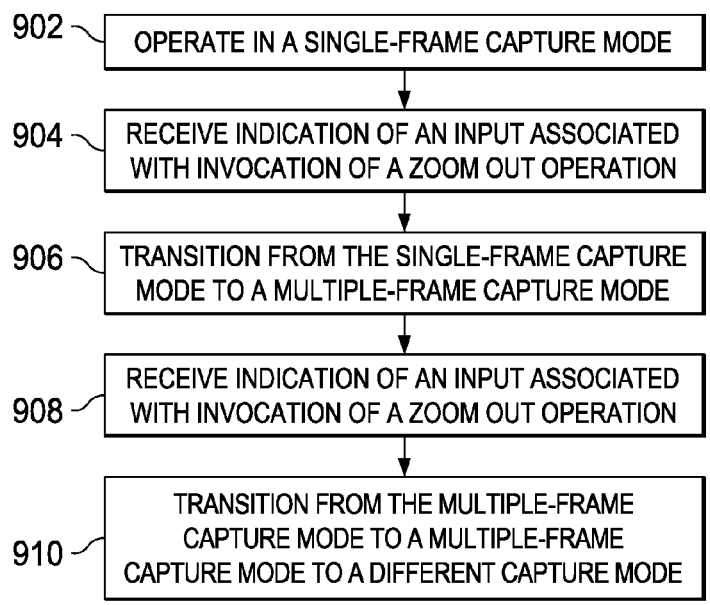
FIG. 9 is a flow diagram illustrating activities associated with transitioning a capture mode according to at least one example embodiment.

FIG. 9 is a flow diagram illustrating activities associated with transitioning a capture mode according to at least one example embodiment. In at least one example embodiment, there is a set of operations that corresponds the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9.

As previously described, it may be desirable to utilize an input associated with invocation of a zoom operation to transition from one multiple-frame capture mode to another multiple-frame capture mode. For example, such transition may be between a rectilinear multiple-frame capture mode and a cylindrical multiple-frame capture mode, between a rectilinear multiple-frame capture mode and a spherical multiple-frame capture mode, between a spherical multiple-frame capture mode and a cylindrical multiple-frame capture mode, and/or the like.

At block 902, the apparatus operates in a single-frame capture mode, similar as described regarding block 502 of FIG. 5. At block 904, the apparatus receives an indication of an input associated with invocation of a zoom out operation, similar as described regarding block 504 of FIG. 5. At block 906, the apparatus transitions from the single-frame capture mode to a multiple-frame capture mode based, at least in part, on the zoom out operation, similar as described regarding block 506 of FIG. 5. At block 908, the apparatus receives indication of another input associated with invocation of a second zoom out operation, similar as described regarding block 904. At block 910, the apparatus transitions from the multiple-frame capture mode to a different multiple-frame capture mode, similar as described regarding FIGS. 4A-4D.

Figure 10:
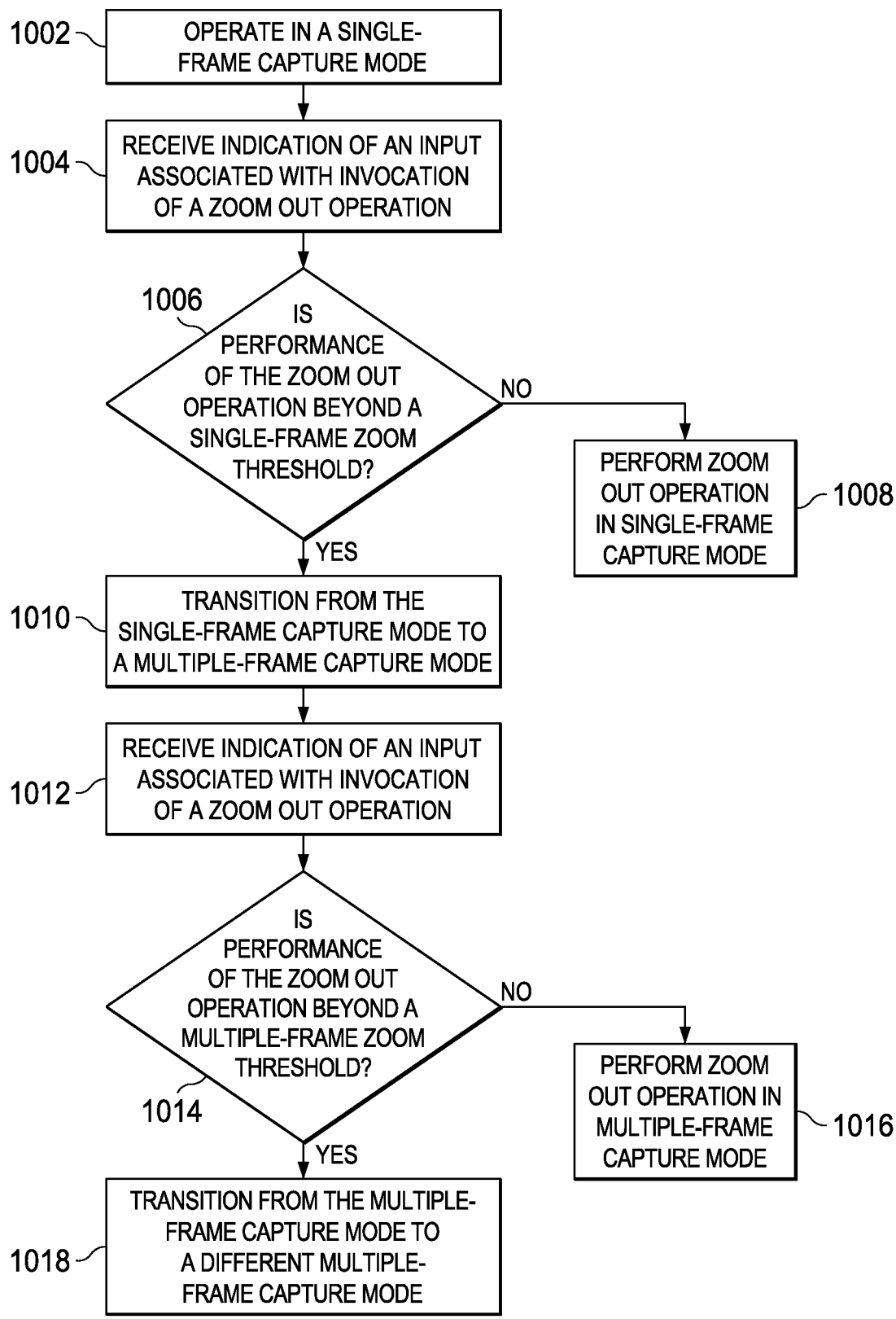
FIG. 10 is a flow diagram illustrating activities associated with transitioning a capture mode according to at least one example embodiment.

FIG. 10 is a flow diagram illustrating activities associated with transitioning a capture mode according to at least one example embodiment. In at least one example embodiment, there is a set of operations that corresponds the activities of FIG. 10. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 10.

At block 1002, the apparatus operates in a single-frame capture mode, similar as described regarding block 502 of FIG. 5. At block 1004, the apparatus receives an indication of an input associated with invocation of a zoom out operation, similar as described regarding block 504 of FIG. 5. At block 1006, the apparatus determines whether performance of the zoom out operation is beyond a single-frame zoom threshold. If the apparatus determines that performance of the zoom out operation is beyond a single-frame zoom threshold, flow proceeds to block 1010. If the apparatus determines that performance of the zoom out operation is within a single-frame zoom threshold, flow proceeds to block 1008. Determination whether a zoom out operation is beyond or within a zoom threshold may be similar as described regarding block 606 of FIG. 6.

At block 1008, the apparatus performs a zoom out operation in the currently operating capture mode, i.e. without transitioning capture mode, similar as described regarding FIGS. 3A-4D. For example, the apparatus may perform the zoom out operation in single-frame capture mode. At block 1010, the apparatus transitions from the single-frame capture mode to a multiple-frame capture mode based, at least in part, on the zoom out operation, similar as described regarding block 506 of FIG. 5. At block 1012, the apparatus receives indication of another input associated with invocation of a second zoom out operation, similar as described regarding block 908 of FIG. 9. At block 1014, the apparatus determines whether performance of the zoom out operation is beyond a multiple-frame zoom threshold. If the apparatus determines that performance of the zoom out operation is beyond the multiple-frame zoom threshold, flow proceeds to block 1018. If the apparatus determines that performance of the zoom out operation is within the multiple-frame zoom threshold, flow proceeds to block 1016. Determination whether a zoom out operation is beyond or within a zoom threshold may be similar as described regarding block 606 of FIG. 6. At block 1016, the apparatus performs a zoom out operation in the currently operating capture mode, i.e. without transitioning capture mode, similar as described regarding FIGS. 3A-4D. For example, the apparatus may perform the zoom out operation the multiple-frame capture mode.

At block 1018, the apparatus transitions from the multiple-frame capture mode to a different multiple-frame capture mode, similar as described regarding block 910 of FIG. 9.

Figure 11A:
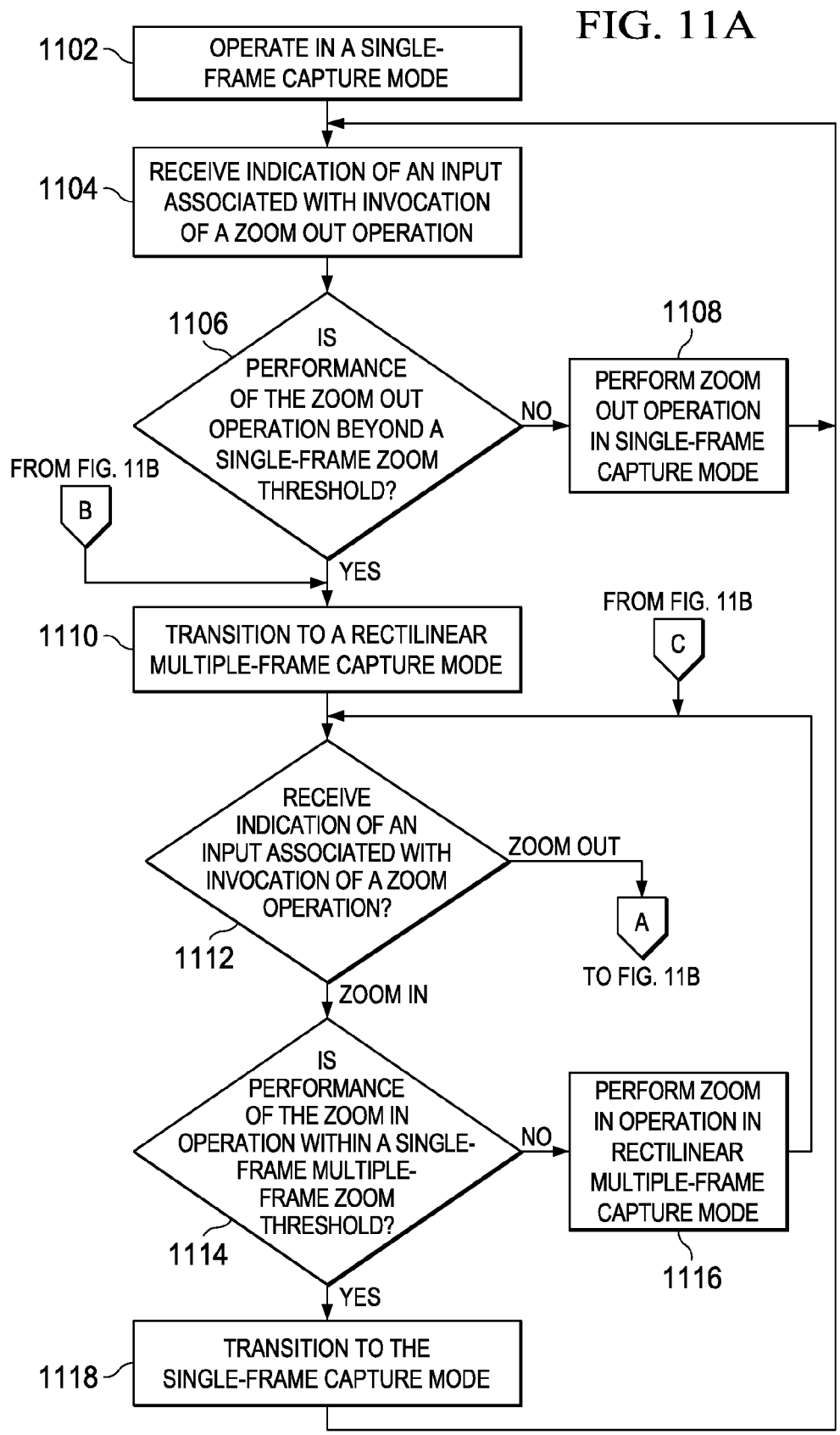
FIGS. 11A-11C is a flow diagram illustrating activities associated with transitioning a capture mode according to at least one example embodiment.
Figure 11B:
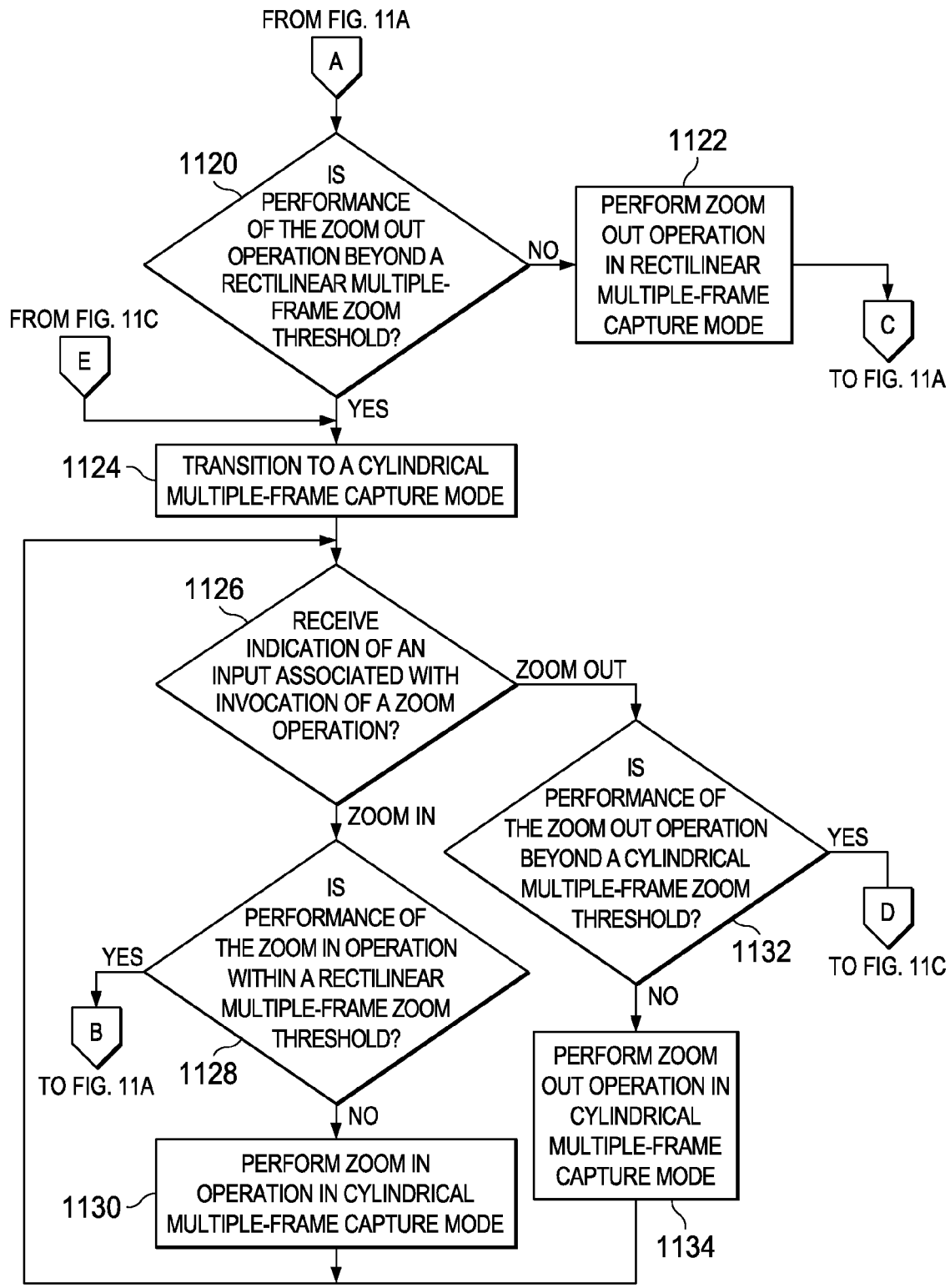
Figure 11C:
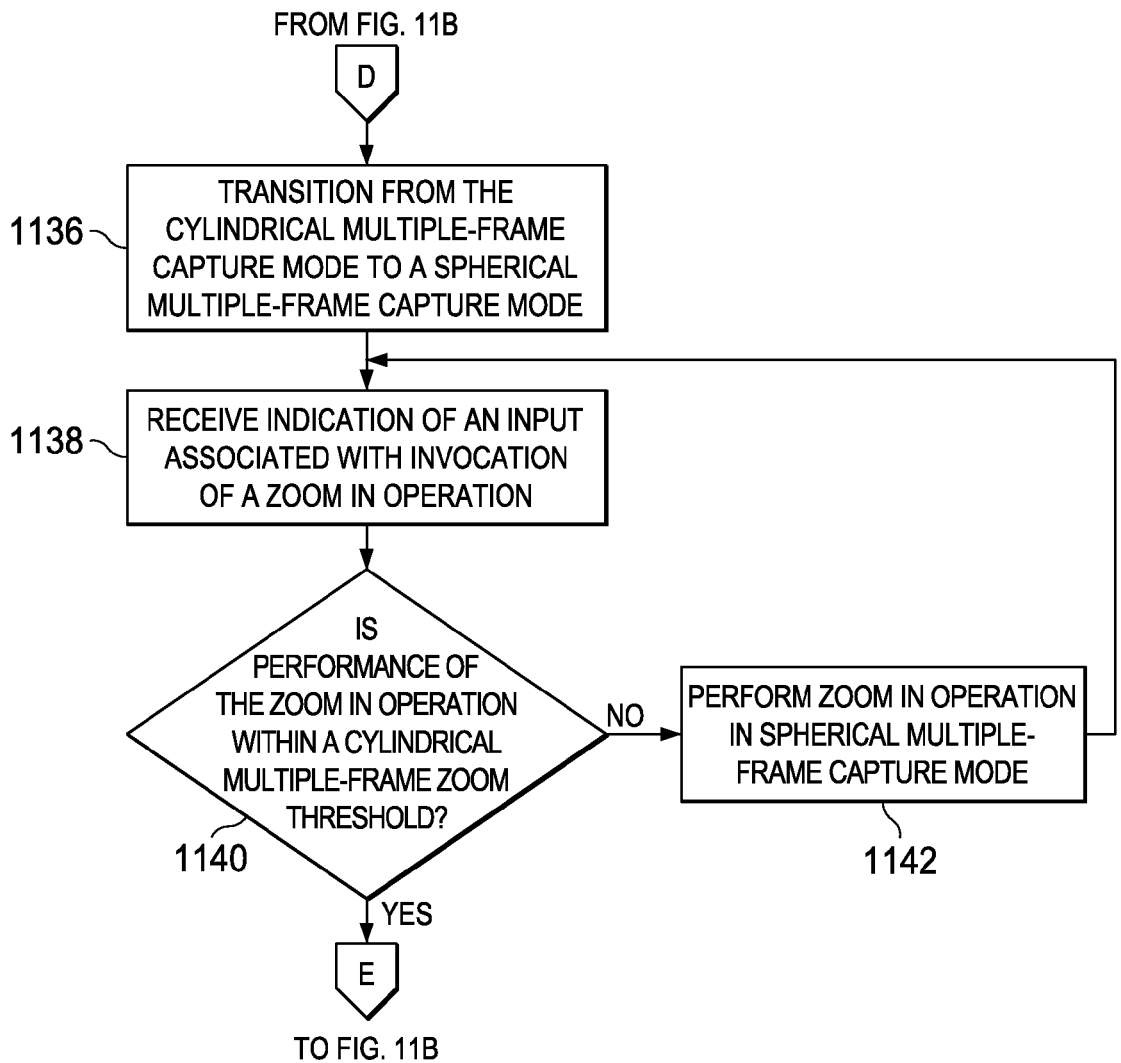

FIGS. 11A-11C is a flow diagram illustrating activities associated with transitioning a capture mode according to at least one example embodiment. In at least one example embodiment, there is a set of operations that corresponds the activities of FIGS. 11A-11C. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIGS. 11A-11C.

The example of FIGS. 11A-11C relates to transitioning among a single-frame capture mode, a rectilinear multiple-frame capture mode, a cylindrical multiple-frame capture mode, and a spherical multiple-frame capture mode. However, these capture modes are merely example and may vary and or be replaced by other capture modes. Therefore, these examples should not limit the claims.

At block 1102, the apparatus operates in a single-frame capture mode, similar as described regarding block 502 of FIG. 5. At block 1104, the apparatus receives an indication of an input associated with invocation of a zoom out operation, similar as described regarding block 504 of FIG. 5. At block 1106, the apparatus determines whether performance of the zoom out operation is beyond a single-frame zoom threshold. If the apparatus determines that performance of the zoom out operation is beyond a single-frame zoom threshold, flow proceeds to block 1110. If the apparatus determines that performance of the zoom out operation is within a single-frame zoom threshold, flow proceeds to block 1108. Determination whether a zoom out operation is beyond or within a zoom threshold may be similar as described regarding FIGS. 4A-4D. At block 1108, the apparatus performs a zoom out operation in the currently operating capture mode, i.e. without transitioning capture mode, similar as described regarding FIGS. 3A-4D. For example, the apparatus may perform the zoom out operation in single-frame capture mode.

At block 1110, the apparatus transitions to a multiple-frame capture mode based, at least in part, on the zoom out operation, similar as described regarding block 506 of FIG. 5. At block 1112, the apparatus receives an indication of an input associated with invocation of a zoom operation. If the zoom operation relates to a zoom in operation, flow proceeds to block 1114. I the zoom operation relates to a zoom out operation, flow proceeds to block 1120. The indication may be a message, a signal, a function call, and/or the like that communicates occurrence of the input. The input and the zoom operation may be similar as described regarding FIGS. 2A-2B. At block 1114, the apparatus determines whether performance of the zoom in operation is within a single-frame zoom threshold. If the apparatus determines that performance of the zoom operation is within a single-frame zoom threshold, flow proceeds to block 1118. If the apparatus determines that performance of the zoom operation is beyond a single-frame zoom threshold, flow proceeds to block 1116. Determination whether a zoom in operation is beyond or within a zoom threshold may be similar as described regarding FIGS. 4A-4D. At block 1116, the apparatus performs a zoom in operation in the currently operating capture mode, i.e. without transitioning capture mode, similar as described regarding FIGS. 3A-4D, and flow proceeds to block 1112. For example, the apparatus may perform the zoom in operation in the rectilinear multiple-frame capture mode. At block 1118, the apparatus transitions from the multiple-frame capture mode to a single-frame capture mode based, at least in part, on the zoom in operation, similar as described regarding block 706 of FIG. 7, and flow proceeds to block 1104.

At block 1120, the apparatus determines whether performance of the zoom out operation is beyond a rectilinear multiple-frame zoom threshold. If the apparatus determines that performance of the zoom out operation is beyond the rectilinear multiple-frame zoom threshold, flow proceeds to block 1124. If the apparatus determines that performance of the zoom out operation is within the rectilinear multiple-frame zoom threshold, flow proceeds to block 1122. Determination whether a zoom out operation is beyond or within a zoom threshold may be similar as described regarding block 606 of FIG. 6. At block 1122, the apparatus performs a zoom out operation in the currently operating capture mode, i.e. without transitioning capture mode, similar as described regarding FIGS. 3A-4D, and flow proceeds to block 1112. For example, the apparatus may perform the zoom out operation the rectilinear multiple-frame capture mode.

At block 1124, the apparatus transitions to a cylindrical multiple-frame capture mode, similar as described regarding block 910 of FIG. 9. At block 1126, the apparatus receives an indication of an input associated with invocation of a zoom operation, similar as described regarding block 1112. If the zoom operation relates to a zoom in operation, flow proceeds to block 1128. I the zoom operation relates to a zoom out operation, flow proceeds to block 1132. At block 1128, the apparatus determines whether performance of the zoom in operation is within a rectilinear multiple-frame zoom threshold. If the apparatus determines that performance of the zoom operation is within a rectilinear multiple-frame zoom threshold, flow proceeds to block 1110. If the apparatus determines that performance of the zoom operation is beyond a single-frame zoom threshold, flow proceeds to block 1130. Determination whether a zoom in operation is beyond or within a zoom threshold may be similar as described regarding FIGS. 4A-4D. At block 1130, the apparatus performs a zoom in operation in the currently operating capture mode, i.e. without transitioning capture mode, similar as described regarding FIGS. 3A-4D, and flow proceeds to block 1126. For example, the apparatus may perform the zoom in operation in the cylindrical multiple-frame capture mode.

At block 1132, the apparatus determines whether performance of the zoom out operation is beyond a cylindrical multiple-frame zoom threshold. If the apparatus determines that performance of the zoom out operation is beyond the cylindrical multiple-frame zoom threshold, flow proceeds to block 1136. If the apparatus determines that performance of the zoom out operation is within the cylindrical multiple-frame zoom threshold, flow proceeds to block 1134. Determination whether a zoom out operation is beyond or within a zoom threshold may be similar as described regarding block 606 of FIG. 6. At block 1134, the apparatus performs a zoom out operation in the currently operating capture mode, i.e. without transitioning capture mode, similar as described regarding FIGS. 3A-4D, and flow proceeds to block 1126. For example, the apparatus may perform the zoom out operation the cylindrical multiple-frame capture mode.

At block 1136, the apparatus transitions from the cylindrical multiple-frame capture mode to a spherical multiple-frame capture mode, similar as described regarding block 910 of FIG. 9. At block 1138, the apparatus receives indication of an input associated with invocation of a zoom in operation similar as described regarding block 704 of FIG. 7.

At block 1140, the apparatus determines whether performance of the zoom in operation is beyond a cylindrical multiple-frame zoom threshold. If the apparatus determines that performance of the zoom out operation is beyond the cylindrical multiple-frame zoom threshold, flow proceeds to block 1142. If the apparatus determines that performance of the zoom out operation is within the multiple-frame zoom threshold, flow proceeds to block 1124. Determination whether a zoom out operation is beyond or within a zoom threshold may be similar as described regarding block 606 of FIG. 6. At block 1142, the apparatus performs a zoom in operation in the currently operating capture mode, i.e. without transitioning capture mode, similar as described regarding FIGS. 3A-4D, and flow proceeds to block 1138. For example, the apparatus may perform the zoom in operation in the spherical multiple-frame capture mode.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 1116 of FIG. 11A may be performed after block 1122. Furthermore, if desired, one or more of the above-described functions may be optional or may be combined. For example, blocks 608 of FIG. 6 may be optional and/or combined with block 606.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus, comprising:
   a processor;
   memory including computer program code, the memory and the computer program code configured to, working with the processor, cause the apparatus to:
   operate in a single-frame capture mode;
   receive indication of a first input associated with invocation of a first zoom out operation; and
   transition from the single-frame capture mode to a first multiple-frame capture mode based, at least in part, on the first zoom out operation, the first multiple frame capture mode being at least one of a rectilinear multiple frame capture mode, a cylindrical multiple-frame capture mode, or a spherical multiple-frame capture mode.

2. The apparatus of claim 1, wherein the memory further includes computer program code, the memory and the computer program code configured to, working with the processor, cause the apparatus to determine that performance of the first zoom out operation is beyond a single-frame zoom threshold, wherein the transition from the single-frame capture mode to the first multiple-frame capture mode is based, at least in part, on the determination that performance of the first zoom out operation is beyond the single-frame zoom threshold.

3. The apparatus of claim 2, wherein the determination that performance of the first zoom out operation in the single-frame capture mode is beyond the single-frame zoom threshold is based, at least in part, on at least one of: determination that performance of the first zoom out operation in the single-frame capture mode is beyond a horizontal single-frame zoom threshold, or determination that performance of the first zoom out operation in the single-frame capture mode is beyond a vertical single-frame zoom threshold.

4. The apparatus of claim 1, wherein the input relates to an inward pinch gesture.

5. The apparatus of claim 1, wherein the memory further includes computer program code, the memory and the computer program code configured to, working with the processor, cause the apparatus to:

receive indication of a second input associated with invocation of a second zoom out operation; and transition from the first multiple-frame capture mode to a second multiple-frame capture mode based, at least in part, on the second zoom out operation.

6. The apparatus of claim 5, wherein the first multiple-frame capture mode is a rectilinear multiple-frame capture mode and the second multiple-frame capture mode is at least one of: a cylindrical multiple-frame capture mode, or a spherical multiple-frame capture mode.

7. The apparatus of claim 5, wherein the memory further includes computer program code, the memory and the computer program code configured to, working with the processor, cause the apparatus to determine that performance of the second zoom out operation in the first multiple-frame capture mode is beyond a first multiple-frame zoom threshold, wherein the transition from the first multiple-frame capture mode to the second multiple-frame capture mode is based, at least in part, on the determination that performance of the second zoom out operation in the first multiple-frame capture mode is beyond the first multiple-frame zoom threshold.

8. The apparatus of claim 5, wherein the memory further includes computer program code, the memory and the computer program code configured to, working with the processor, cause the apparatus to:

receive indication of a third input associated with invocation of a zoom in operation; and transition from the second multiple-frame capture mode to the first multiple-frame capture mode based, at least in part, on the zoom in operation.

9. The apparatus of claim 1, wherein the apparatus is a mobile phone.

10. A method comprising:

operating in a single-frame capture mode;

receiving indication of a first input associated with invocation of a first zoom out operation; and transitioning from the single-frame capture mode to a first multiple-frame capture mode based, at least in part, on the first zoom out operation, the first multiple frame capture mode being at least one of a rectilinear multiple frame capture mode, a cylindrical multiple-frame capture mode, or a spherical multiple-frame capture mode.

11. The method of claim 10, further comprising determining that performance of the first zoom out operation is beyond a single-frame zoom threshold, wherein the transition from the single-frame capture mode to the first multiple-frame capture mode is based, at least in part, on the determination that performance of the first zoom out operation is beyond the single-frame zoom threshold.

12. The method of claim 11, wherein the determination that performance of the first zoom out operation in the single-frame capture mode is beyond the single-frame zoom threshold is based, at least in part, on at least one of: determination that performance of the first zoom out operation in the single-frame capture mode is beyond a horizontal single-frame zoom threshold, or determination that performance of the first zoom out operation in the single-frame capture mode is beyond a vertical single-frame zoom threshold.

13. The method of claim 10, wherein the input relates to an inward pinch gesture.

14. The method of claim 10, further comprising:

receiving indication of a second input associated with invocation of a second zoom out operation; and transitioning from the first multiple-frame capture mode to a second multiple-frame capture mode based, at least in part, on the second zoom out operation.

15. The method of claim 14, wherein the first multiple-frame capture mode is a cylindrical multiple-frame capture mode and the second multiple-frame capture mode is a spherical multiple-frame capture mode.

16. The method of claim 14, further comprising determining that performance of the second zoom out operation in the first multiple-frame capture mode is beyond a first multiple-frame zoom threshold, wherein the transition from the first multiple-frame capture mode to the second multiple-frame capture mode is based, at least in part, on the determination that performance of the second zoom out operation in the first multiple-frame capture mode is beyond the first multiple-frame zoom threshold.

17. The method of claim 14, further comprising:

receiving indication of a third input associated with invocation of a zoom in operation; and transitioning from the second multiple-frame capture mode to the first multiple-frame capture mode based, at least in part, on the zoom in operation.

18. A non-transitory computer-readable medium encoded with instructions that, when executed by a computer, perform:

operating in a single-frame capture mode;

receiving indication of a first input associated with invocation of a first zoom out operation; and transitioning from the single-frame capture mode to a first multiple-frame capture mode based, at least in part, on the first zoom out operation, the first multiple frame capture mode being at least one of a rectilinear multiple frame capture mode, a cylindrical multiple-frame capture mode, or a spherical multiple-frame capture mode.

19. The medium of claim 18, further encoded with instructions that, when executed by a computer, perform determining that performance of the first zoom out operation is beyond a single-frame zoom threshold, wherein the transition from the single-frame capture mode to the first multiple-frame capture mode is based, at least in part, on the determination that performance of the first zoom out operation is beyond the single-frame zoom threshold.

20. The medium of claim 19, wherein the determination that performance of the first zoom out operation in the single-frame capture mode is beyond the single-frame zoom threshold is based, at least in part, on at least one of: determination that performance of the first zoom out operation in the single-frame capture mode is beyond a horizontal single-frame zoom threshold, or determination that performance of the first zoom out operation in the single-frame capture mode is beyond a vertical single-frame zoom threshold.

21. The medium of claim 18, wherein the input relates to an inward pinch gesture.

22. The medium of claim 18, further encoded with instructions that, when executed by a computer, perform:

receiving indication of a second input associated with invocation of a second zoom out operation; and transitioning from the first multiple-frame capture mode to a second multiple-frame capture mode based, at least in part, on the second zoom out operation.

23. The medium of claim 22, wherein the first multiple-frame capture mode is a cylindrical multiple-frame capture mode and the second multiple-frame capture mode is a spherical multiple-frame capture mode.

24. The medium of claim 22, further encoded with instructions that, when executed by a computer, perform determining that performance of the second zoom out operation in the first multiple-frame capture mode is beyond a first multiple-frame zoom threshold, wherein the transition from the first multiple-frame capture mode to the second multiple-frame capture mode is based, at least in part, on the determination that performance of the second zoom out operation in the first multiple-frame capture mode is beyond the first multiple-frame zoom threshold.

25. The medium of claim 22, further encoded with instructions that, when executed by a computer, perform:

receiving indication of a third input associated with invocation of a zoom in operation; and transitioning from the second multiple-frame capture mode to the first multiple-frame capture mode based, at least in part, on the zoom in operation.

* * * * *